(12) United States Patent
Miyagawa et al.

(10) Patent No.: US 7,774,985 B2
(45) Date of Patent: Aug. 17, 2010

(54) DRIVE APPARATUS FOR SLIDING MEMBER

(75) Inventors: Masazumi Miyagawa, Yamanashi (JP); Masashi Shimizu, Yamanashi (JP); Keiichiro Okuyama, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 484 days.

(21) Appl. No.: 11/806,380

(22) Filed: May 31, 2007

(65) Prior Publication Data

US 2008/0036317 A1   Feb. 14, 2008

(30) Foreign Application Priority Data

Aug. 11, 2006   (JP) ............... 2006-219963

(51) Int. Cl.
*E05F 11/00* (2006.01)

(52) U.S. Cl. .......................................... 49/360; 49/349

(58) Field of Classification Search ................... 49/360, 49/352, 349

See application file for complete search history.

(56) References Cited

U.S. PATENT DOCUMENTS 6,131,482 A * 10/2000 Klippert et al. ............ 74/502.6
7,287,804 B2 * 10/2007 Yamagishi et al. .......... 296/155
7,556,577 B2 * 7/2009 Kita et al. .................... 474/117
7,568,310 B2 * 8/2009 Sato et al. ...................... 49/360
2005/0055883 A1 * 3/2005 Sato et al. ...................... 49/360
2006/0174542 A1 * 8/2006 Bernard et al. ................ 49/352

FOREIGN PATENT DOCUMENTS

JP   2004-300827 A   10/2004

* cited by examiner

*Primary Examiner*—Gregory J. Strimbu
(74) *Attorney, Agent, or Firm*—Foley & Lardner LLP

(57) ABSTRACT

A driving apparatus for a sliding member includes a housing, a cable, a drum to move the cable to open and close the sliding member, a motor arranged to drive the drum, and a tensioner supported by the housing arranged to provide a tensioning force to the cable, the tensioner is arranged: to be switched from a first state where an urging force of a spring is stored to a second state where the urging force of the spring is released, to be moved from a first position where the tensioner does not provide the tensioning force to the cable to a second position where the tensioner provides an initial tensioning force to the cable when the tensioner is in the first state, and to be fixed in the second position and to be switched to the second state to provide the tensioning force to the cable by the urging force of the spring.

5 Claims, 9 Drawing Sheets

DRIVE APPARATUS FOR SLIDING MEMBER

BACKGROUND OF THE INVENTION

This invention relates to a sliding drive apparatus arranged to open and close a driven member supported by a vehicle body, by a power from a motor.

A Published Japanese Patent Application Publication No. 2004-300827 shows a sliding drive apparatus includes a cable connected to a driven member such as a sliding door supported by a vehicle body to be opened and closed; a drum capable of winding the cable; a motor arranged to drive the drum; and a tensioner arranged to provide a tensioning force to the cable by eliminating sag of the cable. The sliding drive apparatus is arranged to wind the cable around the drum by rotating the drum by the motor, and thereby to move the driven member to be opened and closed.

In this sliding drive apparatus, when the cable is connected to the driven member, the tensioner is temporarily held, against an urging force of a spring, in a non-tensioning region that does not provide the tensioning force to the cable, for facilitating the connection operation. After the cable is connected to the driven member in this temporarily holding state, the tensioner is released from the temporarily holding state, and the cable is provided with the tensioning force by the urging force of the spring.

SUMMARY OF THE INVENTION

In the sliding drive apparatus described in this patent document, in a case in which the tensioner is released from the temporarily holding state, the urging force of the spring of the tensioner is applied to provide the tensioning force to the cable from that position. Therefore, for eliminating the large sag of the cable, it is necessary to lengthen activation stroke of the tensioner, and to use a large spring suitable for that activation stroke. Consequently, there are problems that size of the tensioner is increased, and that the driven member is not smoothly moved to be opened and closed for excessive tensioning force applied to the cable.

It is, therefore, an object of the present invention to provide a sliding drive apparatus devised to decrease the size, and to eliminate sag of a cable surely.

According to one aspect of the present invention, A sliding drive apparatus comprises: a housing; a cable connected to a driven member provided to a vehicle body to be opened and closed; a drum arranged to wind the cable to open and close the driven member; a motor arranged to drive the drum; a tensioner supported by the housing, and arranged to provide a tensioning force to the cable, to be switched from a first state that an urging force of a spring is stored, and to a second state that the urging force of the spring is released, to be moved between a first position that the tensioner does not provide the tensioning force to the cable, and a second position that the tensioner provides the initial tensioning force is provided to the cable when the tensioner is in the first state, and to be switched to the second state by fixing in the second position, and thereby to provide the tensioning force to the cable by the urging force of the spring.

DETAILED DESCRIPTION OF THE INVENTION

Figure 1:
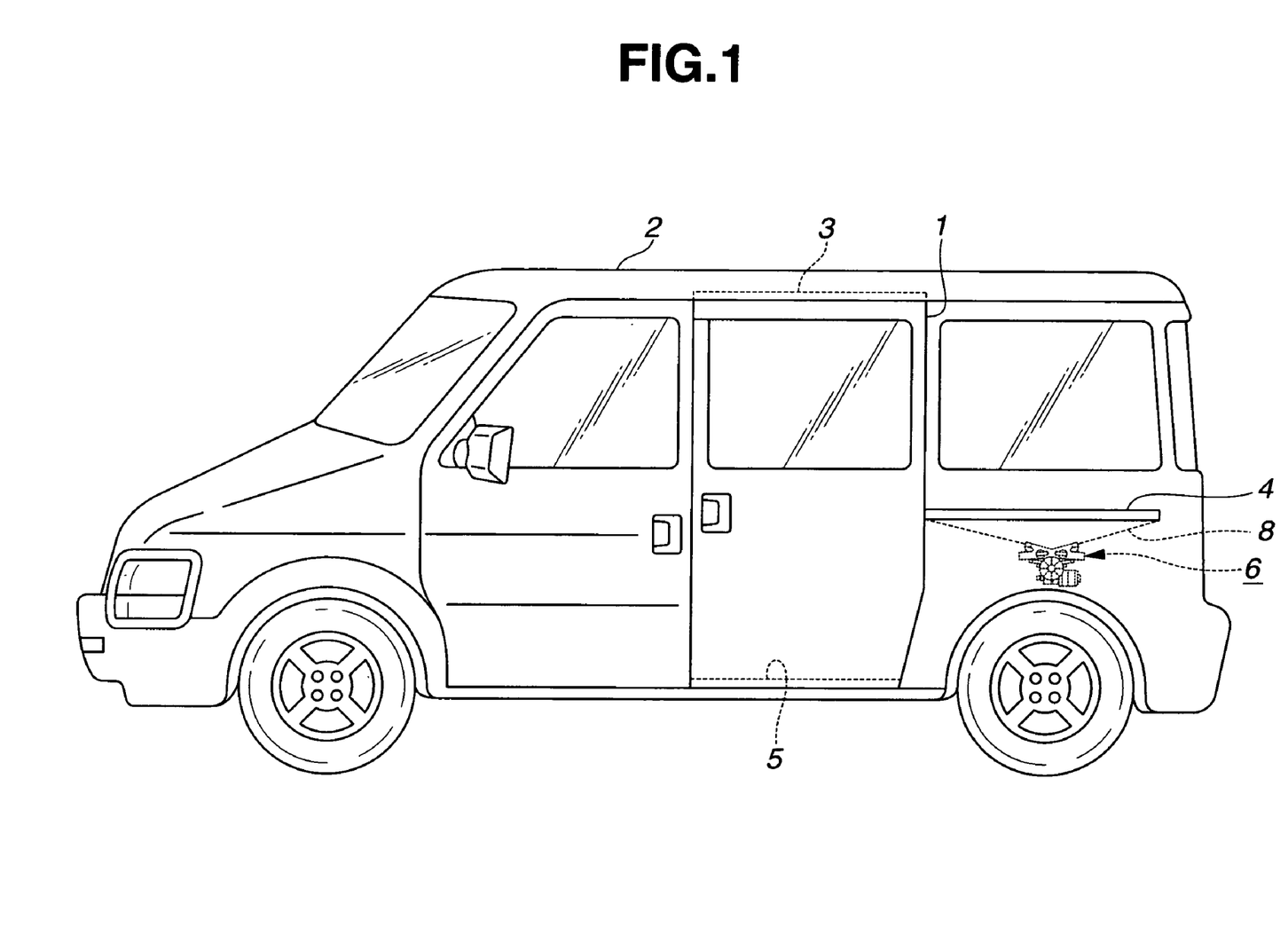
FIG. 1 is a side view showing a vehicle which employs a sliding drive apparatus according to an embodiment of the present invention.
Figure 2:
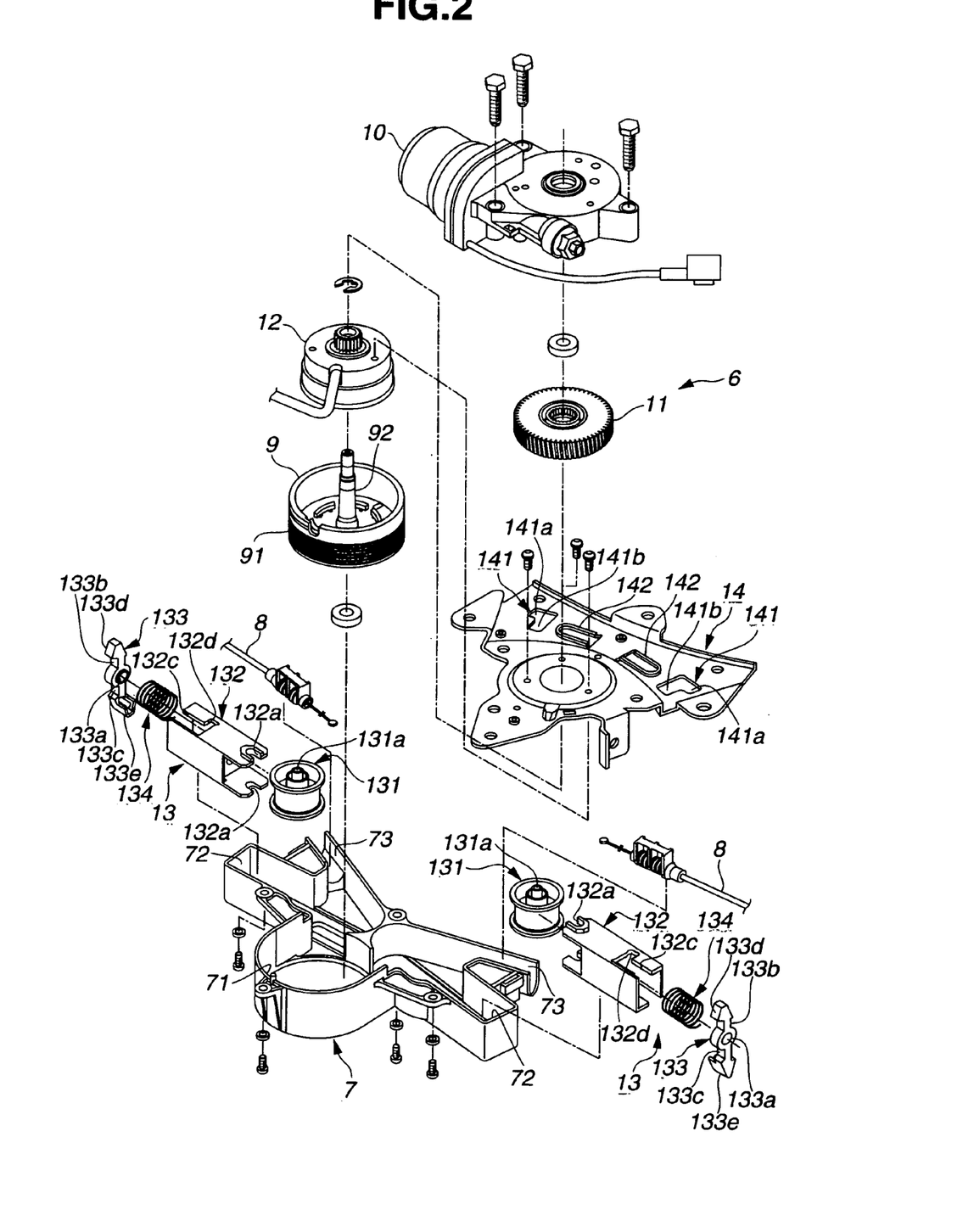
FIG. 2 is an exploded view showing the sliding drive apparatus.
Figure 3:
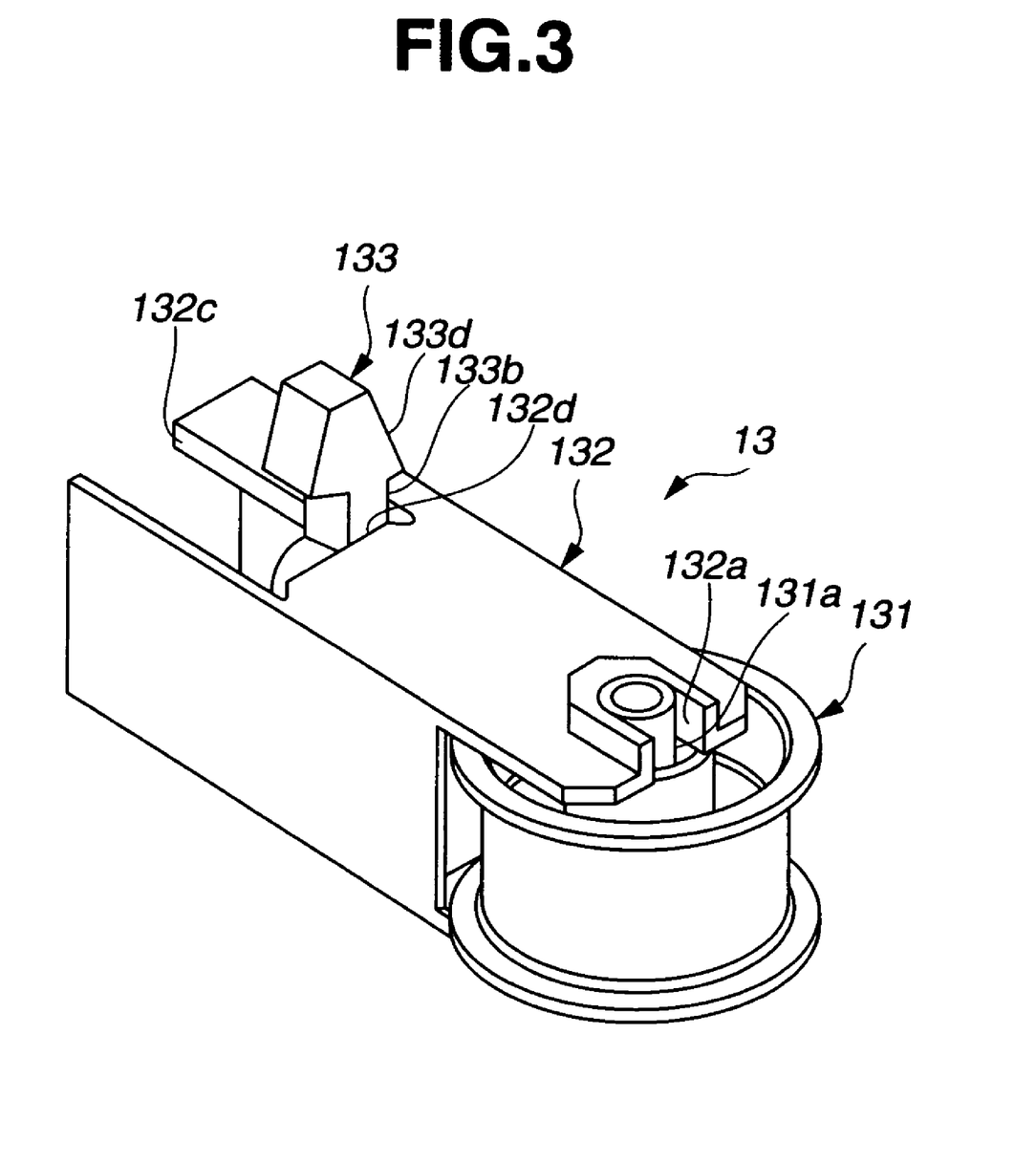
FIG. 3 is an enlarged perspective view showing a main part.
Figure 4:
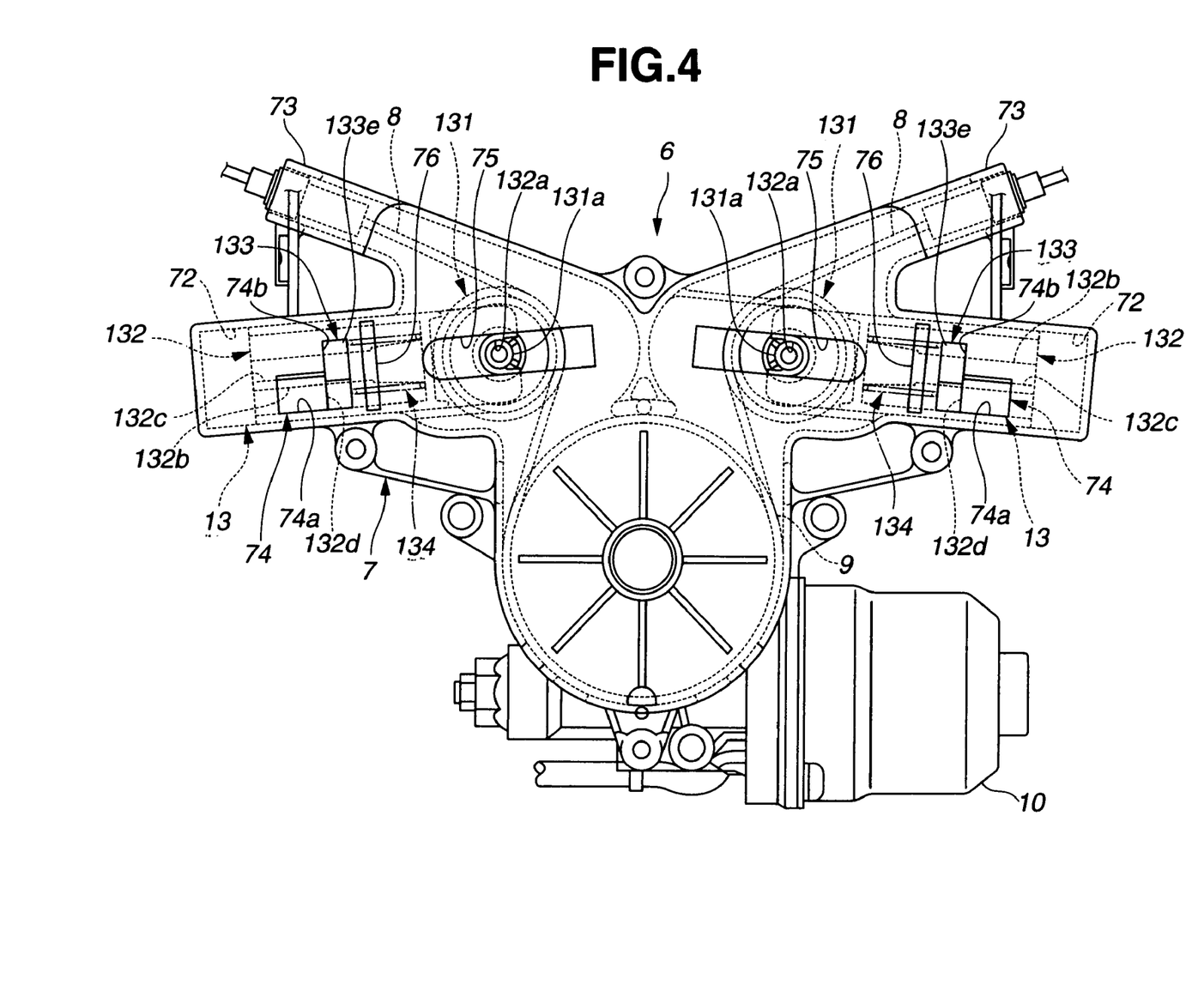
FIG. 4 is a side view showing the sliding drive apparatus.
Figure 5:
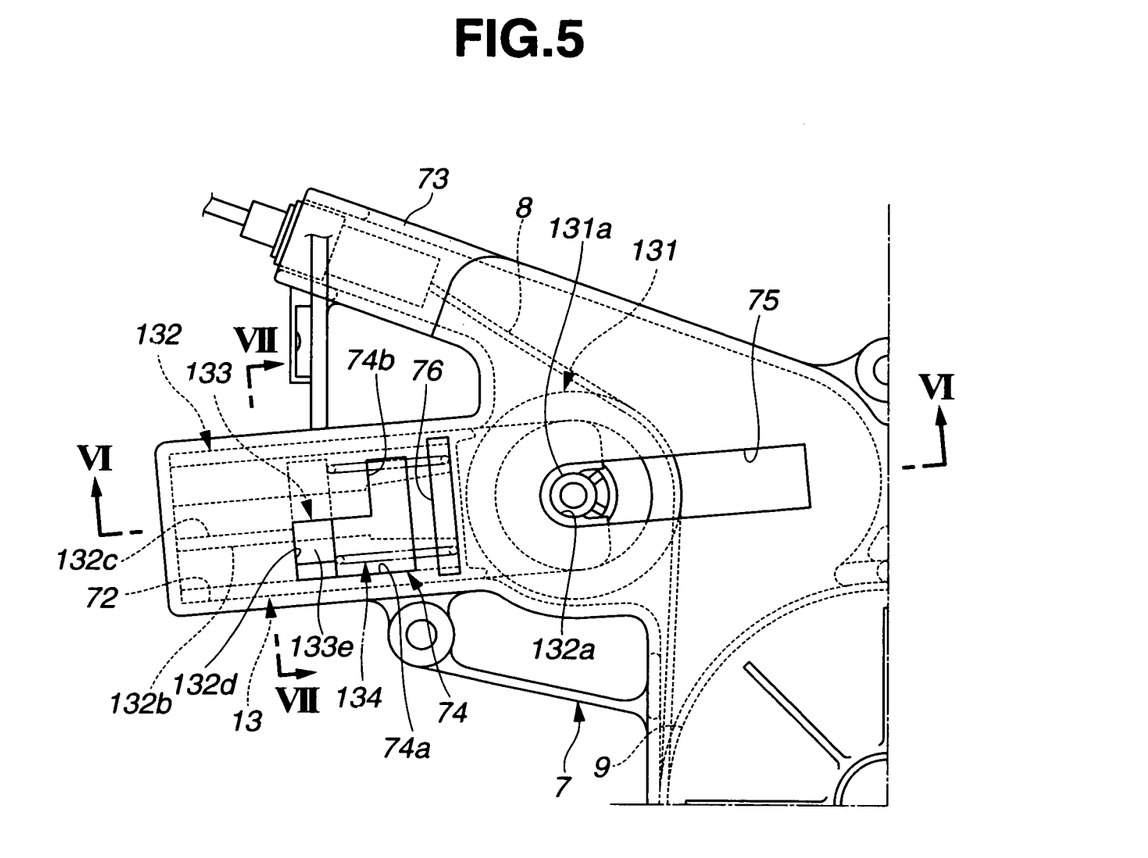
FIG. 5 is an enlarged side view showing a main part in a temporarily assembled state.
Figure 6:
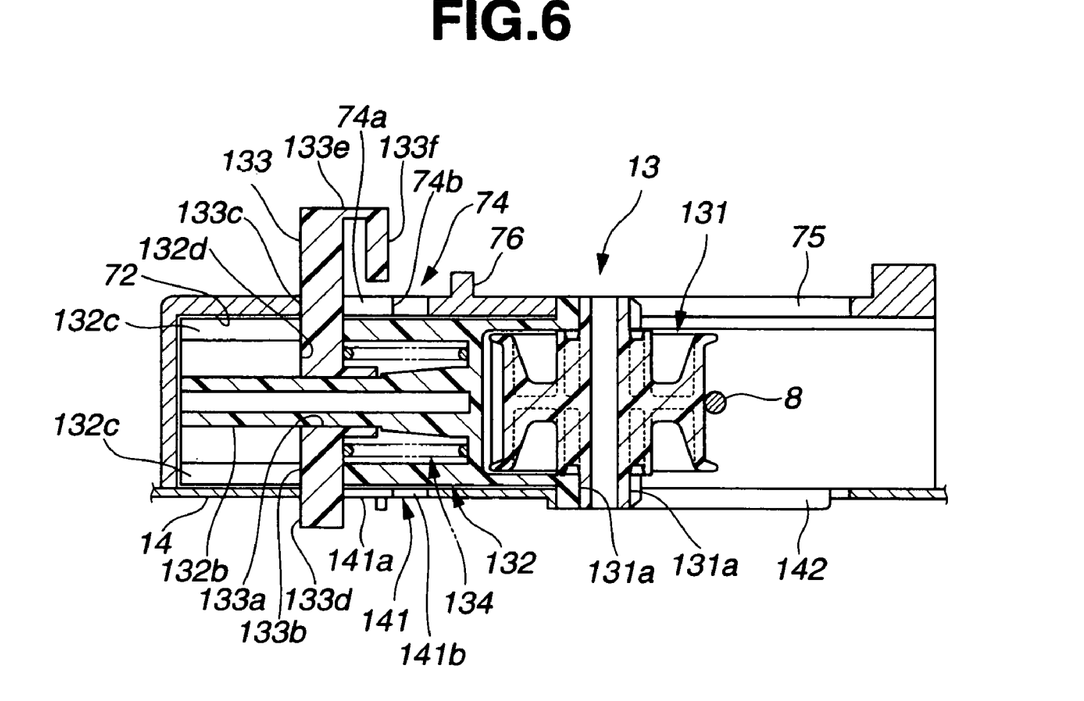
FIG. 6 is a lateral sectional view taken along a section line VI-VI of FIG. 5.
Figure 7:
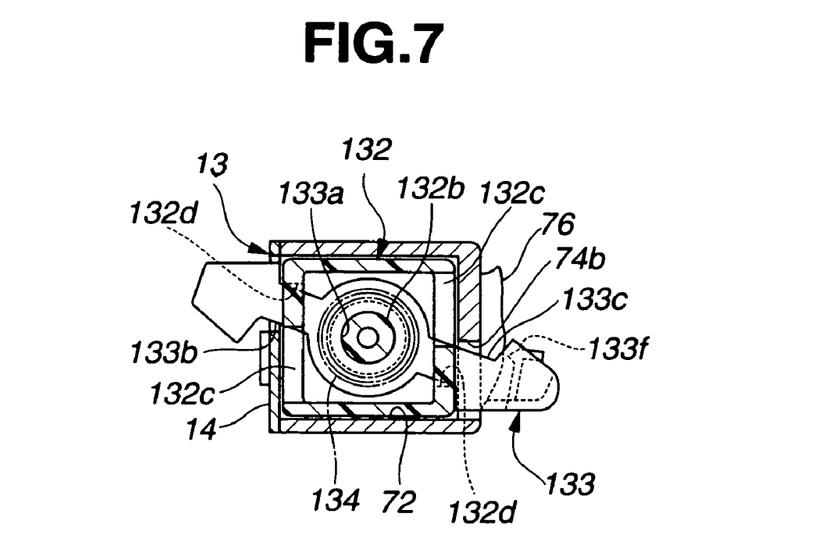
FIG. 7 is a longitudinal sectional view taken along a section line VII-VII of FIG. 5.
Figure 8:
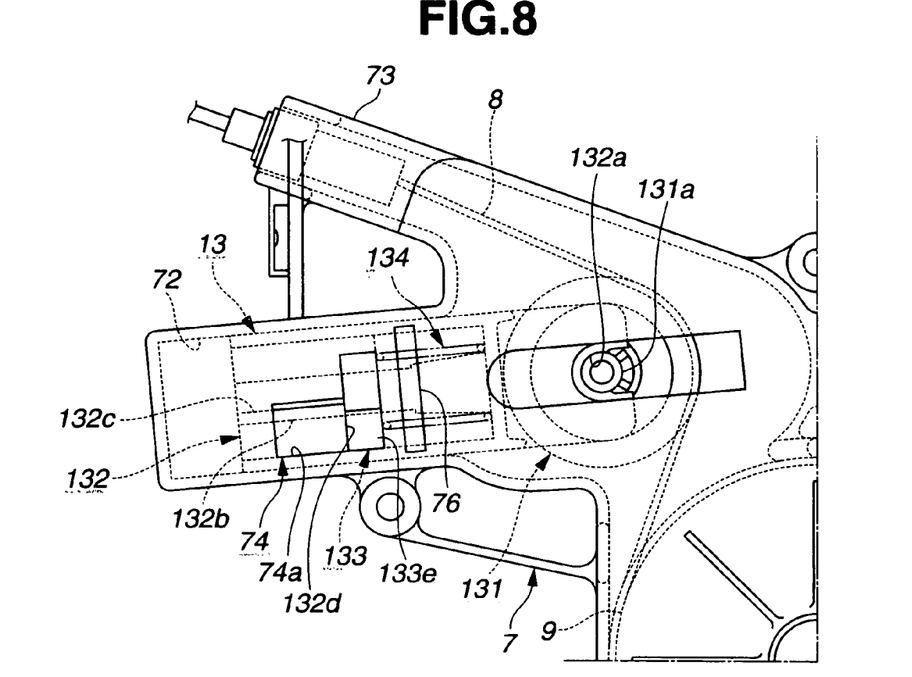
FIG. 8 is an enlarged side view showing the main part in middle of the assembly operation.
Figure 9:
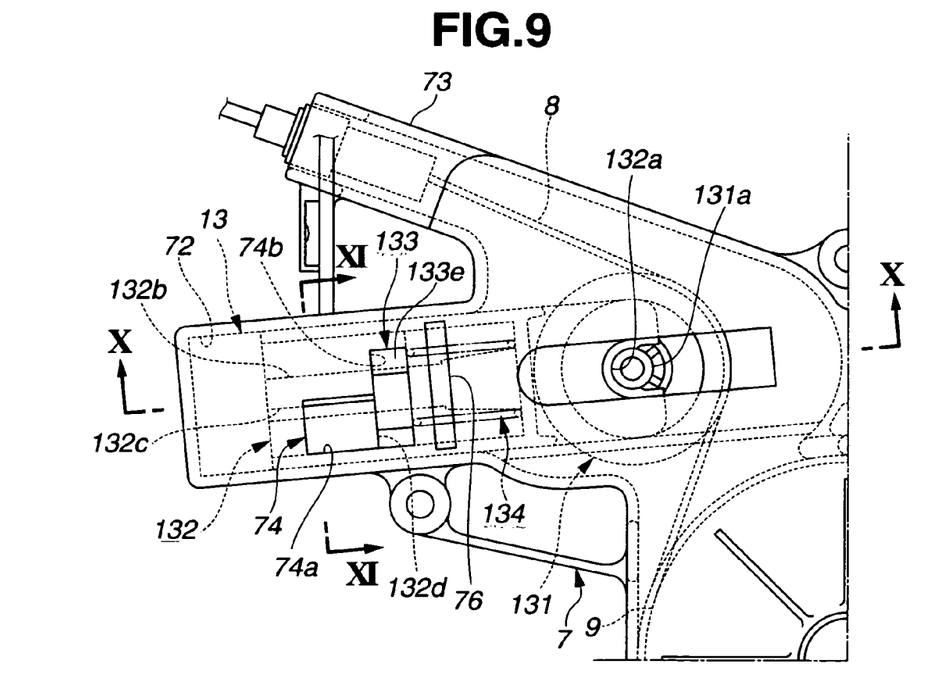
FIG. 9 is an enlarged side view showing the main part after completion of the assembly operation.
Figure 10:
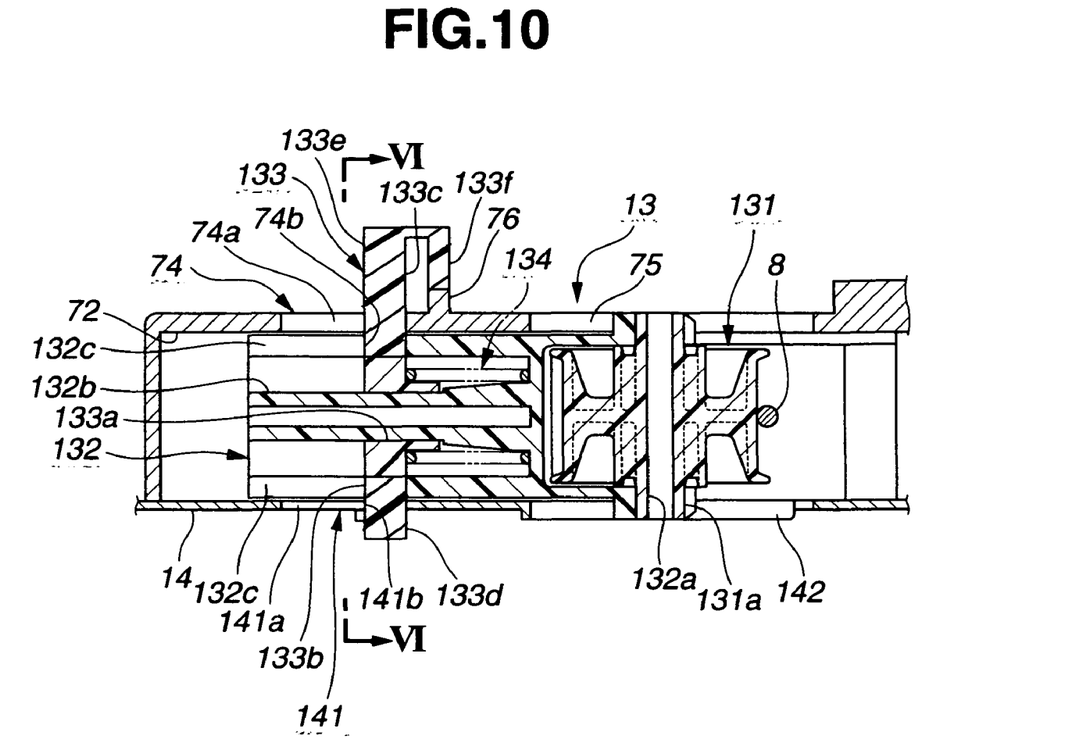
FIG. 10 is a lateral sectional view taken along a section line X-X of FIG. 9.
Figure 11:
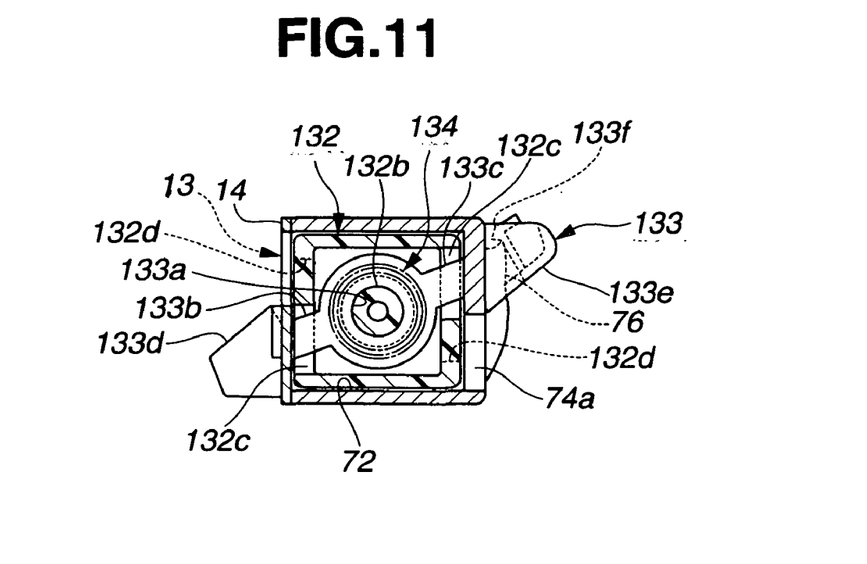
FIG. 11 is a longitudinal sectional view taken along a section line XI-XI of FIG. 9.
Figure 12:
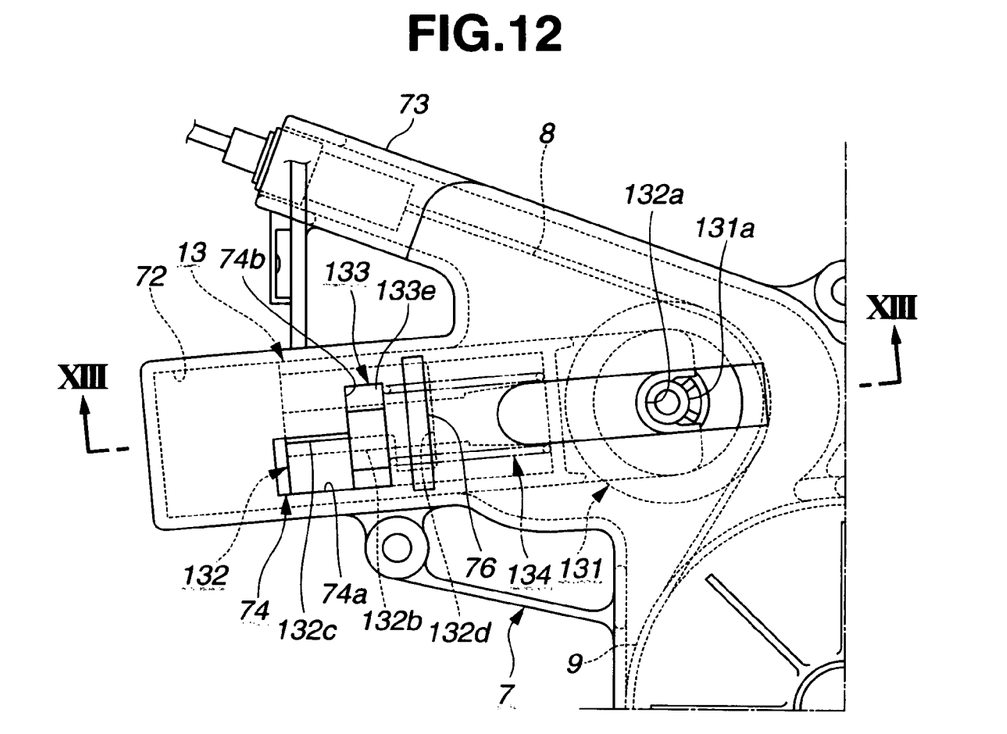
FIG. 12 is an enlarged side view showing the main part at activation.
Figure 13:
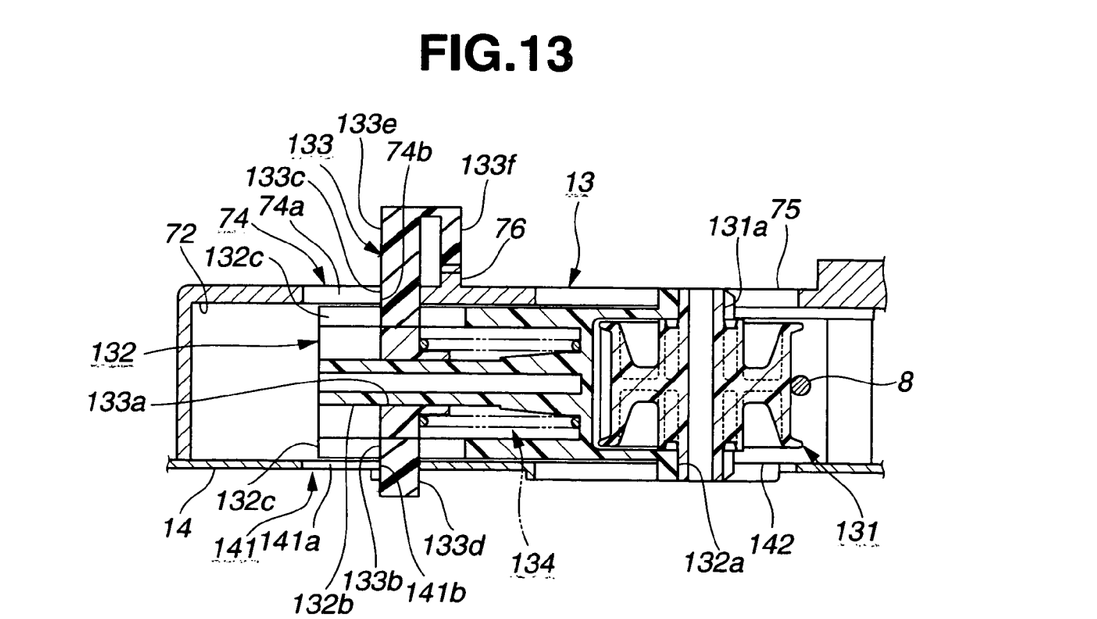
FIG. 13 is a lateral sectional view taken along a section line XIII-XIII of FIG. 12.

Hereinafter, an embodiment according to the present invention will be illustrated with reference to the drawings. FIG. 1 is a side view showing a vehicle which employs a sliding drive apparatus according to an embodiment of the present invention. FIG. 2 is an exploded perspective view showing the sliding drive apparatus. FIG. 3 is an enlarged perspective view showing a main part. FIG. 4 is a side view showing the sliding drive apparatus. FIG. 5 is an enlarged side view showing the main part in a temporarily assembled state. FIG. 6 is a lateral sectional view taken along a section line VI-VI of FIG. 5. FIG. 7 is a longitudinal sectional view taken along a section line VII-VII of FIG. 5. FIG. 8 is an enlarged side view showing the main part in the way of the assembly operation. FIG. 9 is an enlarged side view showing the main part after completion of the assembly operation. FIG. 10 is a lateral sectional view taken along a section line X-X of FIG. 9. FIG. 11 is a longitudinal sectional view taken along a section line XI-XI of FIG. 9. FIG. 12 is an enlarged side view showing the main part at operation. FIG. 13 is a lateral sectional view taken along a section line XIII-XIII of FIG. 12. Hereinafter, leftward directions as viewed in FIGS. 1 and 4, and an obliquely downward right direction as viewed in FIG. 2 correspond to a forward direction. Rightward directions as viewed in FIGS. 1 and 4, and an obliquely upward left direction as viewed in FIG. 2 correspond to a rearward direction. Front and back sides of FIGS. 1 and 4, and upward and downward directions as viewed in FIG. 2 correspond to leftward and rightward directions.

As shown in FIG. 1, a sliding door 1 serves as a driven member of a vehicle of minivan or wagon type. Sliding door 1 is supported by upper, middle and lower guide rails 3, 4 and 5 provided on a side surface of a vehicle body 2, and arranged to be opened and closed along guide rails 3, 4 and 5 in the forward and rearward directions. Sliding door 1 is arranged to be moved by manual operation or a sliding drive apparatus 6 mounted on a rear portion of vehicle body 2. Sliding door 1 is moved from a fully closed position that a door opening is closed, and moved slightly outwardly with respect to an outside surface of vehicle body 2 to a full open position along the side surface of vehicle body 2 in the rearward direction. Moreover, sliding door 1 can be moved in a forward direction opposite to the above-described direction.

As shown in FIG. 2, sliding drive apparatus 6 includes a housing 7 made from a synthetic resin, and fixed to the rearward portion of vehicle body 2 through a base plate 14 made from metal; forward and rearward cables 8 and 8 connected to sliding door 1; a drum 9 arranged to wind cables 8 and 8; a motor 10 arranged to drive drum 9; a worm wheel 11 arranged to be rotated by motor 10; and an electromagnetic clutch 12 arranged to connect and disconnect a power transmitting path between worm wheel 11 and drum 9; and forward and rearward tensioners 13 and 13 arranged to provide tensioning force to cables 8 and 8 by eliminating sag of cables 8 and 8.

Housing 7 includes a cylindrical drum receiving portion 71 receiving drum 9; forward and rearward tensioner receiving portions 72 and 72 receiving forward and rearward tensioners 13 and 13 respectively, having a substantially rectangular shape in a longitudinal section, and extending in the forward and rearward directions; and forward and rearward cable support portions 73 and 73 through which cables 8 and 8 pass respectively. Housing 7 includes a side surface having an opening, and the opening of housing 7 is closed by base plate 14.

As shown in FIG. 2, portions of base plate 14 which close tensioner receiving portions 72 and 72 are formed with regulating grooves 141 and 141 each of which is in the form of L-shape as viewed from a side. Each of regulating grooves 141 and 141 includes a sliding groove portion 141a extending in the forward and rearward directions, and a restriction groove portion 141b bent downward at a substantially right angle from one end portion of sliding groove portion 141a (an end portion nearer to cable 8).

Between forward and rearward regulating grooves 141 and 141, there are formed elongated grooves 142 and 142 engaged, respectively, with bearing portions 132a and 132a described later to be slid in the forward and rearward directions.

Moreover, housing 7 includes regulating grooves 74 and 74 each of which is in the form of L-shape as viewed from the side, and each of which confronts one regulating groove 141 of base plate 14; and elongated grooves 75 and 75 each extending in the forward and rearward directions, and each confronting one elongated groove 142 of base plate 14. Each regulating groove 141 of base plate 14 and one regulating groove 74 of housing 7 are formed to direct the L-shape of regulating groove 141 and the L-shape of regulating groove 74 in the opposite direction in the upward and downward directions. That is, each restriction groove portion 74b of regulating groove 74 of housing 7 are formed in an upward direction at a substantially right angle from one end portion (an end portion nearer to cable 8) of sliding groove portion 74a extending in the forward and rearward directions.

Drum 9 is rotatably supported by a shaft portion 92 thereof in drum receiving portion 71 of housing 7. Drum 9 includes a helical groove 91 that cables 8 are wound.

Worm wheel 11, electromagnetic clutch 12, and drum 9 are stacked in a same axis. When electromagnetic clutch 12 is excited, the power transmitting path between worm wheel 11 and drum 9 is connected, and the rotation of motor 10 is transmitted to drum 9.

Cables 8 wound on drum 9 are discharged from housing 7 through cable support portions 73 and 73 of housing 7, and routed, respectively around guide members (not shown) provided at a forward end portion and a rearward end portion of guide rail 4. Each cable 8 has an end portion connected to sliding door 1.

When an operation switch (not shown) provided near a driver's seat, or provided to a wireless remote control switch is operated, motor 10 rotates in a predetermined direction, and electromagnetic clutch 12 is excited. Consequently, the power transmitting path between worm wheel 11 and drum 9 is connected. Accordingly, drum 9 is rotated in a predetermined direction by the rotation of motor 10. Drum 9 winds (reels) one of cables 8, and discharge the other of cables 8. Therefore, sliding door 1 is moved in the opening direction or the closing direction.

Next, tensioner 13 will be illustrated. Besides, forward and rearward tensioners 13 and 13 confront each other in the forward and rearward directions, and have symmetrical shapes in the forward and rearward directions. Accordingly, the only front tensioner 13 will be illustrated. However, in FIG. 3, rearward tensioner 13 is shown.

Tensioner 13 is retained in tensioner receiving portion 72 of housing 7 to be moved in the forward and rearward directions. Tensioner 13 includes a holder 132 having a substantially rectangular parallelepiped shape, and received in tensioner receiving portion 72 of housing 7 to be moved only in the forward and rearward directions; a guide pulley 131 including shaft portions 131a and 131a rotatably supported, respectively, by left and right bearing portions 132a and 132a provided at one end portion (located near to cable 8) of holder 132, and serving as a guiding member to guide cable 8; a stopper 133 mounted in holder 132 to be rotatably slid in the forward and rearward directions; and a compression coil spring 134 disposed between holder 132 and stopper 133, and arranged to apply an urging force to holder 132.

Guide pulley 131 can be moved together with holder 132 in the forward and rearward directions along elongated grooves 75 and 142 of housing 7 and base plate 14. Guide pulley 131 presses cable 8 in a direction perpendicular to a movement direction of cable 8, to provide the tensioning force to cable 8 to eliminate the sag of cable 8.

Holder 132 includes switching grooves each of which is in the form of L-shape as viewed from the side, which are formed in left and right side surfaces of holder 132, and each of which has a sliding groove portion 132c extending in the forward and rearward directions; and a restriction groove portion 132d bent at a substantially right angle from one end portion of sliding groove portion 132c. Within holder 132, there is provided a shaft portion 132b extending in the rearward direction by a predetermined amount.

The switching grooves of holder 132 are overlapped, respectively, with regulating groove 74 of housing 7 and regulating groove 141 of base plate 14. Regulating groove 74 of housing 7 and one of the switching grooves of holder 132 confronting regulating groove 74 are formed to direct the L-shape of regulating groove 74 and the L-shape of the switching groove in the opposite directions in the upward and downward directions. Regulating groove 141 of base plate 14 and the other of the switching grooves of holder 132 confronting regulating groove 141 are formed to direct the L-shape of regulating groove 141 and the L-shape of the other of the switching grooves in the opposite directions in the upward and downward directions. That is, in a case in which restriction groove portion 74b of regulating groove 74 of housing 7 is bent upward at the substantially right angle from the one end portion of sliding groove portion 74a, restriction groove portion 132d of the switching groove of holder 132 overlapped with regulating groove 74 is bent downward at the substantially right angle from the one end portion of sliding groove portion 132c, and partially overlapped with sliding groove 74a, and sliding groove portion 132c of the switching groove is partially overlapped with restriction groove portion 74b of regulating groove 74.

Stopper 133 includes a shaft hole 133a formed at a central portion thereof, and mounted on shaft portion 132b of holder 132; and left and right arm portions 133b and 133c loosely slidably mounted in the switching grooves of holder 132.

Accordingly, stopper 133 is rotatably supported in a restriction position (cf. FIG. 7) that stopper 133 is engaged with restriction groove portion 132d of holder 132, and in a release position (cf. FIG. 11) that stopper 133 is disengaged from restriction groove portion 132d, and can be slid along sliding groove portion 132c of holder 132 in the forward and rearward directions.

In a case in which stopper 133 is in the release position, holder 132 and stopper 133 can be moved relatively. In a case in which stopper 133 is in the restriction position, holder 132 and stopper 133 can not be moved relatively.

Arm portions 133b and 133c of stopper 133 are movably engaged with regulating grooves 141 and 74 of base plate 14 and housing 7. In a case in which stopper 133 is in the restriction position, arm portions 133b and 133c are loosely engaged with sliding groove portions 141a and 74a to be slid in the forward and rearward directions. In a case in which stopper 133 is in the release position, arm portions 133b and 133c are engaged with restriction groove portions 141b and 74b in the forward and rearward directions.

At ends of arm portions 133b and 133c of stopper 133, there are provided, respectively, knob portions 133d and 133e protruding, respectively, from regulating grooves 141 and 74 of base plate 14 and housing 7. These knob portions 133d and 133e can be operated from the outside of housing 7, and stopper 133 can be moved to the release position by operating (moving) these knob portions 133d and 133e.

At knob portion 133e of stopper 133 protruding from regulating groove 74 of housing 7, there is provided an engagement portion 133f elastically engaged with a protruding portion 76 provided on housing 7 to elastically hold stopper 133 in the release position.

Compression coil spring 134 is provided between holder 132 and stopper 133 in a state that compression coil spring 134 is wound on shaft portion 132b of holder 132. In the case in which stopper 133 is in the restriction position, compression coil spring 134 is compressed between holder 132 and stopper 133 to store the urging force. In the case in which stopper 133 is in the release position, the urging force of compression coil spring 134 is released, and urges holder 132 in a direction to eliminate the sag of cable 8, that is, in the rearward direction.

Thus-constructed tensioner 13 can be switched between a first state (cf. FIGS. 5, 6 and 8) that stopper 133 is in the restriction position to store the urging force of compression coil spring 134 between holder 132 and stopper 133, and a second state (cf. FIGS. 4, 9, 10, 12 and 13) that stopper 133 is in the release position to release the urging force of compression coil spring 134. Tensioner 13 is assembled in advance in the first state, and then received in tensioner receiving portion 72.

When tensioner 13 received in tensioner receiving portion 72 is in the first state, left and right arm portions 133b and 133c of stopper 133 are engaged with sliding groove portions 141a and 74a of regulating grooves 141 and 74 of base plate 14 and housing 7 to be slid in the forward and rearward directions, and tensioner 13 can be freely moved between a first position (a forward position that is apart from cable 8 as shown in FIGS. 5 and 6) that guide pulley 131 does not provide the tensioning force to cable 8, and a second position (a rearward position that abuts on cable 8 as shown in FIG. 8) that guide pulley 131 is pressed on cable 8, and can provide an appropriate initial tensioning force.

Accordingly, in a case in which tensioner 13 is in the first state, cable 8 is not applied with the tensioning force, and it is possible to readily connect cable 8 to sliding door 1.

After cable 8 is connected to sliding door 1, tensioner 13 is moved to the second position in the first state as shown in FIG. 8 to provide the initial tensioning force to cable 8. In the case in which tensioner 13 is moved to the second position, arm portions 133b and 133c of stopper 133 are brought to a state to be engaged with restriction groove portions 141b and 74b of regulating grooves 141 and 74 of base plate 14 and housing 7. Consequently, in the case in which tensioner 13 is moved to the second position and stopper 133 is moved to the release position as shown in FIGS. 9~13 to switch tensioner 13 to the second state, arm portions 133b and 133c of stopper 133 are engaged with restriction groove portions 141b and 74b of regulating grooves 141 and 74 of base plate 14 and housing 7. Accordingly, stopper 133 can not be moved in the forward and rearward directions, and stopper 133 is restricted in the second position.

The above-described operation can be performed by picking and moving knob portions 133d and 133e of stopper 133 which protrude, respectively, from regulating grooves 141 and 74 of base plate 14 and housing 7.

Besides, in the case in which tensioner 13 is in the first state and arm portions 133b and 133c of stopper 133 are engaged, respectively, with sliding groove portions 141a and 74a of regulating grooves 141 and 74 of base plate 14 and housing 7, sliding groove portions 141a and 74a serving as limiting members restrict (prevent) the movement of stopper 133 to the release position. Consequently, tensioner 13 can not be switched to the second state in positions other than the second position.

In the case in which tensioner 13 is switched to the second state in the second position, the urging force of compression coil spring 134 is released. Accordingly, holder 132 and guide pulley 131 are urged in the rearward direction by the urging force of compression coil spring 134, and guide pulley 131 is pressed on cable 8. Consequently, in a case in which sliding door 1 is moved to be opened or closed by sliding drive apparatus 6 and cables 8 are sagged, guide pulleys 131 are pressed on cables 8 by the urging force of compression coil springs 134, so as to provide the tensioning force to cables 8. The regulation of the movement amount of tensioner 13 in the second state is performed by restriction groove portion 132d of holder 132 and arm portion 133c of stopper 133 to restrict the movement amount of holder 132, and not to cause the unnecessary sag of cable 8.

It is optional to employ, as the driven member, a sliding sunroof, and a window capable of being opened and closed.

It is optional that tensioner 13 is supported by a housing different from the housing supporting drum 9.

It is optional to integrally form tensioner 13 and a guide member arranged to guide cable 8 to eliminate the sag of cable 8, so that the guide member is located at end portion of tensioner 13, instead of guide pulley 131.

It is optional to use a member other than stopper 133, to fix tensioner 13 to the second position, instead of engaging stopper 133 with housing 7. It is possible to use tightening member such as a screw, an engagement member to engage with holder 132 and housing 7.

It is optional to provide, on base plate 14, protruding portion 76 and engagement portion 133f to fix stopper 133 to the second position. Thereby, it is possible to ensure operation in case of fixing by operating knob portion 133d protruding from base plate 14.

In the sliding drive apparatus according to the embodiment of the present invention, a sliding drive apparatus includes a housing; a cable connected to a driven member provided to a vehicle body to be opened and closed; a drum arranged to wind the cable to open and close the driven member; a motor arranged to drive the drum; a tensioner supported by the housing, and arranged to provide a tensioning force to the cable, to be switched from a first state that an urging force of a spring is stored, and to a second state that the urging force of the spring is released, to be moved between a first position that the tensioner does not provide the tensioning force to the cable, and a second position that the tensioner provides the initial tensioning force is provided to the cable when the tensioner is in the first state, and to be switched to the second state by fixing in the second position, and thereby to provide the tensioning force to the cable by the urging force of the spring.

In this structure, in the case in which the tensioner is in the first state, the tensioning force is not applied to the cable. Accordingly, it is possible to facilitate the connection operation of the cable to the driven member. In the case in which the tensioner is in the first state, and fixed to the second position, it is possible to provide the appropriate initial tensioning force to the cable. Moreover, the tensioner is switched to the second state in the second position, and accordingly it is possible to eliminate the sag by providing the tensioning force to the cable by the urging force of the spring. Consequently, the tensioner is acted from the second position to provide the appropriate tensioning force to the cable by the urging force of the spring. Accordingly, it is possible to decrease the size, and to surely eliminate the sag of the cable.

In the sliding drive apparatus according to the embodiment of the present invention, the tensioner includes a holder supported in the housing, and arranged to be moved between the first position and the second position in the first state of the tensioner, a stopper arranged to be moved between the first position and the second position with the holder by engagement with the holder, and the spring retained between the holder and the stopper, arranged to store the urging force.

In this structure, it is simplify the structure of the tensioner, and to decrease the size of the tensioner.

In the sliding drive apparatus according to the embodiment of the present invention, the tensioner is brought to the second state by disengaging the stopper from the holder in the second position; and the stopper is engaged with the housing, and fixed in the second position.

In this structure, the tensioner is switched to the second state, and fixed in the second position by the simple operation that disengages the stopper from the holder. Consequently, it is possible to provide the tensioning force to the cables.

In the sliding drive apparatus according to the embodiment of the present invention, the stopper is supported to be moved between a restriction position that the stopper is engaged with the holder, and a release position that the stopper is disengaged with the holder; and the stopper includes a picking portion protruding from the housing, and arranged to move the stopper to the release position.

In this structure, it is possible to operate the knob portion of the stopper from the outside of the housing, and thereby to readily switch the tensioner to the second state.

In the sliding drive apparatus according to the embodiment of the present invention, the holder includes a shaft portion extending parallel with a movement direction of the holder; and the stopper is mounted on the shaft portion to be rotatably slid between the restriction position and release position in an axial direction.

In this structure, it is possible to simplify the structure of the tensioner, and to further decrease the size of the tensioner.

In the sliding drive apparatus according to the embodiment of the present invention, the stopper includes an engagement portion holding the stopper in the release position by engaging with a protrusion provided on the housing by moving to the release position.

In this structure, it is possible to surely hold the stopper in the release position, by moving the stopper to the release position.

In the sliding drive apparatus according to the embodiment of the present invention, the holder presses a guiding member provided at one end of the holder, on the cable in a direction perpendicular to a movement direction of the cable, to provide the tensioning force to the cable.

In this structure, it is possible to apply the tensioning force to the cable, and to perform the smooth movement of the cable by pressing the guide pulley on the cable.

In the sliding drive apparatus according to the embodiment of the present invention, the housing includes a limiting portion to prevent the switching of the tensioner to the second state when the tensioner is located at a position other than the second position.

In this structure, the tensioner can not be switched to the second state in the positions other than the second position, and it is possible to surely switch the tensioner in the second position to the second state.

This application is based on a prior Japanese Patent Application No. 2006-219963. The entire contents of the Japanese Patent Application No. 2006-219963 with a filing date of Aug. 11, 2006 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A driving apparatus for a sliding member comprising:
   a housing;
   a cable arranged to be connected to the sliding member which is arranged to be opened and closed on a vehicle body;
   a drum arranged to move the cable to open and close the sliding member;
   a motor arranged to drive the drum;
   a tensioner supported by the housing, wherein the tensioner is:
      moveable from a first state in which an urging force of a spring is stored and not provided to the cable to a second state in which the urging force of the spring is released and provided to the cable,
      moveable, when the tensioner is in the first state, between a first position and a second position in which the tensioner provides an initial tensioning force to the cable which is not provided by the urging force of the spring, and
      arranged to be fixed in the second position and the second state, thereby to provide a tensioning force to the cable by the urging force of the spring, wherein the tensioner comprises:
      a holder supported in the housing and arranged to be moved between the first position and the second position when the tensioner is in the first state,
      a stopper arranged to be moved between the first position and the second position with the holder by engagement with the holder, and
      the spring, wherein the spring is retained between the holder and the stopper and arranged to store the urging force, wherein the stopper is supported to be moved between a restriction position in which the stopper retains the tensioner in the first state, and a release position in which the stopper releases the urging force of the spring;

wherein the stopper includes a picking portion protruding from the housing and arranged to move the stopper to the release position;

wherein the holder includes a shaft portion extending parallel with a movement direction of the holder; and the stopper is mounted on the shaft portion to be rotated about an axis of the shaft portion between the restriction position and the release position.

2. The driving apparatus for the sliding member as claimed in claim 1, wherein the housing includes a limiting portion arranged to prevent the movement of the tensioner to the second state when the tensioner is located at a position other than the second position.

3. The driving apparatus for the sliding member as claimed in claim 1, wherein the holder is arranged to press a guiding member, which is provided at one end of the holder, onto the cable, in a direction perpendicular to a movement direction of the cable, to provide the tensioning force to the cable.

4. The driving apparatus for the sliding member as claimed in claim 1, wherein the driving apparatus is configured such that when the stopper is moved into the release position when the tensioner is in the second position, the stopper engages the housing fixing the tensioner in the second position.

5. The driving apparatus for the sliding member as claimed in claim 1, wherein the stopper includes an engagement portion arranged to hold the stopper in the release position by engaging with a protrusion provided on the housing.

* * * * *